US011024194B1

(12) United States Patent
Beigman Klebanov et al.

(10) Patent No.: US 11,024,194 B1
(45) Date of Patent: Jun. 1, 2021

(54) VIRTUAL READING COMPANION TECHNOLOGY TO SUPPORT THE ACQUISITION OF READING FLUENCY

(71) Applicant: Educational Testing Service, Princeton, NJ (US)

(72) Inventors: Beata Beigman Klebanov, Hopewell, NJ (US); Rene R. Lawless, Pennington, NJ (US); John Sabatini, Cherry Hill, NJ (US); Markku T. Hakkinen, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 352 days.

(21) Appl. No.: 15/814,487

(22) Filed: Nov. 16, 2017

Related U.S. Application Data

(60) Provisional application No. 62/423,482, filed on Nov. 17, 2016.

(51) Int. Cl.
*G09B 17/00* (2006.01)
*G09B 17/04* (2006.01)
*G09B 17/02* (2006.01)
*G10L 13/00* (2006.01)

(52) U.S. Cl.
CPC .......... *G09B 17/006* (2013.01); *G09B 17/02* (2013.01); *G09B 17/04* (2013.01); *G10L 13/00* (2013.01)

(58) Field of Classification Search
CPC .................................................. G09B 17/006
USPC ......................................................... 434/178
See application file for complete search history.

(56) References Cited

PUBLICATIONS

Cunningham, Anne, Stanovich, Keith; Tracking the Unique Effects of Print Exposure in Children: Associations With Vocabulary, General Knowledge, and Spelling; Journal of Educational Psychology, 13(2); pp. 264-274; 1991.

Daane, Mary, Campbell, Jay, Grigg, Wendy, Goodman, Madeline, Oranje, Andreas; Fourth-Grade Students Reading Aloud: NAEP 2002 Special Study of Oral Reading; National Center for Educational Statistics, Institute of Education Sciences, U.S. Department of Education; Oct. 2005.

DeMeglio, Marisa, Hakkinen, Markku, Kawamura, Hiroshi; Accessible Interface Design: Adaptive Multimedia Information System (AMIS); Proceedings of the International Conference on Computers for Handicapped Persons; pp. 406-112; Jul. 2002.

(Continued)

*Primary Examiner* — Kesha Frisby
(74) *Attorney, Agent, or Firm* — Jones Day

(57) ABSTRACT

Systems and methods of improving reading fluency by presenting a virtual reading partner that takes turns reading aloud with a reader, are presented. First audio data comprising speech corresponding to the reader reading aloud from a first portion of a written transcript is received. The first audio data is processed to identify spoken words from the speech. The reader's speaking of the words in the first portion of the written transcript are compared to correct speaking of words in the first portion of the written transcript. A reading fluency of the reader is assessed. Second audio data comprising a pre-recorded narration of a second portion of the written transcript or automatically generated text to speech of the second portion is generated. The virtual reading partner is presented to the reader and takes turns reading aloud with the reader until the end of the written transcript has been reached.

20 Claims, 7 Drawing Sheets

(56) References Cited

PUBLICATIONS

Evanini, Keelan, Heilman, Michael, Wang, Xinhao, Blanchard, Daniel; Automated Scoring for the TOEFL Junior Comprehensive Writing and Speaking Test; ETS Research Report, 2015(1); pp. 1-11; Jun. 2015.

Gaida, Christian, Lange, Patrick, Petrick, Rico, Proba, Patrick, Malatawy, Ahmed, Suendermann-Oeft, David; Comparing Open-Source Speech Recognition Toolkits; DHBW Stuttgart Technical Report; 2014.

Good, Roland, Kaminski, Ruth; DIBELS Next Assessment Manual; Dynamic Measurement Group, Eugene Or; 2011.

Graesser, Arthur, D'Mello, Sidney; Moment-To-Moment Emotions During Reading; The Reading Teacher, 66(3); pp. 238-242; 2012.

Hagen, Andreas, Pellom, Bryan, Cole, Ronald; Children's Speech Recognition with Application to Interactive Books and Tutors; IEEE Workshop on Automatic Speech Recognition and Understanding; pp. 186-191; 2003.

Hakkinen, Markku, Kerscher, George; Applying a Navigation Layer to Digital Talking Books: SMIL, XML, and NCX; Proceedings of the Web and Multimedia Workshop at WWW9; Amsterdam; Jan. 2000.

Hakkinen, Mark, Kerscher, George; Structured Audio: Using Document Structure to Navigate Audio Information; Presentation at the CSUN Conference on Technologies and Disabilities; San Diego, CA; Mar. 1998.

Hart, Betty, Risley, Todd; The Social World of Children: Learning to Talk; Paul H. Brookes Publishing Company: Baltimore, MD; 1999.

Ivanov, Alexei, Lange, Patrick, Suendermann-Oeft, David, Ramanarayanan, Vikram, Qian, Yao, Yu, Zhou, Toa, Jidong; Speed vs. Accuracy: Designing an Optimal ASR System for Spontaneous Non-Native Speech in a Real-Time Application; Proceedings of IWSDS; pp. 1-12; 2016.

Kantor, Arthur, Cernak, Milos, Havelka, Jiri, Huber, Sean, Kleindienst, Jan, Gonzalez, Doris; Reading Companion: The Technical and Social Design of an Automated Reading Tutor; Proceedings of the Third Workshop on Child, Computer and Interaction; Portland, OR; pp. 53-59; 2012.

Lehman, Blair, Matthews, Melanie, D'Mello, Sidney, Person, Natalie; What Are You Feeling? Investigating Student Affective States During Expert Human Tutoring Sessions; Proceedings of the Ninth International Conference on Intelligent Tutoring Systems; pp. 50-59; 2008.

Miller, Justin, Schwanenflugel, Paula; A Longitudinal Study of the Development of Reading Prosody as a Dimension of Oral Reading Fluency in Early Elementary School Children; Reading Research Quarterly, 43(4); pp. 336-354; Oct. 2008.

Miller, Justin, Schwanenflugel, Paula; Prosody of Syntactically Complex Sentences in the Oral Reading of Young Children; Journal of Education Psychology, 98(4); pp. 839-843; Nov. 2006.

NAEP Report, 2015; http://www.nationsreportcard.gov/reading_math_2015/#reading/acl?grade=4.

Nagel, Katherine; Transition to Employment and Community Life for Youths With Visual Impairments: Current Status and Future Directions; Journal of Visual Impairment & Blindness, 95(12); pp. 725-738; 2001.

National Braille Press; The Need for Braille; http://www.nbp.org/ic/nbp/braille/needforbraille.html; 2016.

NISO; Specifications for the Digital Talking Book; http://www.niso.org/workrooms/daisy/Z39-86/2002.html; 2002.

Pikulski, John, Chard, David; Fluency: Bridge Between Decoding and Reading Comprehension; The Reading Teacher, 58(6); pp. 510-519; 2005.

Qian, Yao, Wang, Xinhao, Evanini, Keelan, Suendermann-Oeft, David; Improving DNN-Based Automatic Recognition of Non-native Children Speech with Adult Speech; Proceedings of Workshop on Child Computer Interaction; Sep. 2016.

Ryles, Ruby; The Impact of Braille Reading Skills on Employment, Income, Education, and Reading Habits; Journal of Visual Impairment & Blindness, 90(3); pp. 219-226; May-Jun. 1996.

Sabatini, John, Bruce, Kelly, Steinberg, Jonathan; Sara Reading Components Tests, RISE Form: Test Design and Technical Adequacy; Educational Testing Service, Research Report RR-13-08; Apr. 2013.

Shivakumar, Prashanth Gurunath, Potamianos, Alexandros, Lee, Sungbok, Narayanan, Shrikanth; Improving Speech Recognition for Children Using Acoustic Adaptation and Pronunciation Modeling; Proceedings of the Fourth Workshop on Child Computer Interaction; pp. 11-15; 2014.

Shobaki, Khaldoun, Hosom, John-Paul, Cole, Ronald; The OGI Kids' Speech Corpus and Recognizers; Proceedings of ICSLP-2000; Beijing, China; 2000.

Schwanenflugel, Paula, Hamilton, Anne Marie, Wisenbaker, Joseph, Kuhn, Melanie, Stahl, Steven; Becoming a Fluent Reader: Reading Skill and Prosodic Features in the Oral Reading of Young Readers; Journal of Educational Psychology, 96(1); pp. 119-129; Mar. 2004.

Stanovich, Keith, West, Richard, Cunningham, Anne, Cipielewski, Jim, Siddequi, Shahid; The Role of Inadequate Print Exposure as a Determinant of Reading Comprehension Problems; Ch. 2 in Reading Comprehension Difficulties: Processes and Intervention, C. Cornoldi & J. Oakhill (Eds.); Lawrence Erlbaum Associates: Hillsdale, NJ; pp. 15-32; 1996.

VanLehn, Kurt; The Behavior of Tutoring Systems; International Journal of Artificial Intelligence in Education, 16(3); pp. 227-265; 2006.

Zechner, Klaus, Evanini, Keelan, Laitusis, Cara; Using Automatic Speech Recognition to Assess the Reading Proficiency of a Diverse Sample of Middle School Students; Proceedings of the Workshop on Child Computer Interaction; pp. 1-8; 2012.

Zechner, Klaus, Sabatini, John, Chen, Lei; Automatic Scoring of Children's Read-Aloud Text Passages and Word Lists; Proceedings of the NAACL HLT Workshop on Innovative Using of NLP for Building Educational Applications; pp. 10-18; Jun. 2009.

VIRTUAL READING COMPANION TECHNOLOGY TO SUPPORT THE ACQUISITION OF READING FLUENCY

CROSS-REFERENCE TO RELATED APPLICATIONS

This application claims priority to U.S. Provisional Application No. 62/423,482, filed Nov. 17, 2016, the entirety of which is herein incorporated by reference.

TECHNICAL FIELD

The technology described herein relates to reading fluency and more particularly, the evaluation and enhancement of reading fluency through the use of a virtual reading companion.

BACKGROUND

The National Assessment of Education Progress (NAEP) reports 4th grade reading literacy results that continue to show that more than a quarter of U.S. children have below basic reading skills. The NAEP Report of 2015 puts this proportion at 31% of the total population. In the NAEP special study of 4th grade oral reading, a strong relationship between children's oral reading ability and reading comprehension was observed. Children reading at the proficient level averaged about 138 words correct per minute (WCPM), and children at the basic level read at the intermediate speed of 116 WCPM, whereas children below the basic level read at a rate of 84 WCPM. Further, word-reading errors, which likely interfere with comprehension, were concentrated among the lower-level readers.

The problem of low reading accuracy, rate, and fluency takes a toll on a young reader's engagement and motivation to read. While there are many sources of fiction and non-fiction of high interest available to young readers, such a slow, laborious reading process makes the act of reading work, not pleasure. This initiates a vicious cycle where the young reader avoids reading, therefore reducing his exposure to text, and reducing the accumulation of word and language knowledge that supports and builds the stamina and persistence necessary for text-processing efficiency.

The problem is perhaps most acute for children who may not have adults who can read with them. Adults who read to children model language fluency with text as well as proper intonation and expression, often bringing the text to life. Children who do not acquire text fluency in school are left to their own devices to try to bootstrap fluency without the feedback and motivation that could be provided by a caring reader. Throughout the years of schooling, the demands on reading increase in an ever-accelerating pace, and change in accordance with the reading skill trajectory. Milestones along the reading skill trajectory include decoding, fluency, and reading-for-learning skills. Fluency critically bridges decoding and reading-for-learning—until the bridge is crossed, reading cannot effectively support the knowledge acquisition goals that become increasingly central in the curriculum from $3^{rd}$ grade onward, switching from "learning to read" to "reading to learn."

SUMMARY

Systems and methods are provided for improving reading fluency by presenting a virtual reading partner that takes turns reading aloud with a reader. First audio data comprising speech from the reader, wherein the speech corresponds to the reader reading aloud from a first portion of a written transcript, is received. The first audio data is processed to identify spoken words from the speech. Characteristics of the reader's speaking of words in the first portion of the written transcript are compared to correct speaking of the words in the first portion of the written transcript. A reading fluency of the reader is assessed based on the comparing. Second audio data comprising (i) a pre-recorded narration of a second portion of the written transcript; or (ii) automatically generated text-to-speech of the second portion is generated. A length of the second portion is based on the reading fluency. The virtual reading partner is presented to the reader, based on the second audio data, wherein the virtual reading partner and the reader take turns reading aloud until the end of the written transcript has been reached.

As another example, a computer-implemented system for improving reading fluency by presenting a virtual reading partner that takes turns reading aloud with a reader includes one or more data processors and a non-transitory computer-readable medium containing instructions for commanding the one or more data processors to execute steps of a process. In the process, first audio data comprising speech from the reader, wherein the speech corresponds to the reader reading aloud from a first portion of a written transcript, is received. The first audio data is processed to identify spoken words from the speech. Characteristics of the reader's speaking of words in the first portion of the written transcript are compared to correct speaking of the words in the first portion of the written transcript. A reading fluency of the reader is assessed based on the comparing. Second audio data comprising (i) a pre-recorded narration of a second portion of the written transcript; or (ii) automatically generated text-to-speech of the second portion is generated. A length of the second portion is based on the reading fluency. The virtual reading partner is presented to the reader, based on the second audio data, wherein the virtual reading partner and the reader take turns reading aloud until the end of the written transcript has been reached.

As a further example, a non-transitory computer-readable medium contains instructions for commanding the one or more data processors to execute steps of a process for improving reading fluency by presenting a virtual reading partner that takes turns reading aloud with a reader. In the process, first audio data comprising speech from the reader, wherein the speech corresponds to the reader reading aloud from a first portion of a written transcript, is received. The first audio data is processed to identify spoken words from the speech. Characteristics of the reader's speaking of words in the first portion of the written transcript are compared to correct speaking of the words in the first portion of the written transcript. A reading fluency of the reader is assessed based on the comparing. Second audio data comprising (i) a pre-recorded narration of a second portion of the written transcript; or (ii) automatically generated text-to-speech of the second portion is generated. A length of the second portion is based on the reading fluency. The virtual reading partner is presented to the reader, based on the second audio data, wherein the virtual reading partner and the reader take turns reading aloud until the end of the written transcript has been reached. reader take turns reading aloud until the end of the written transcript has been reached.

DETAILED DESCRIPTION

Systems and methods as described herein provide an approach for improving reading fluency by presenting a virtual reading partner that takes turns reading aloud with a reader. Reading fluency refers to the efficient, effective word recognition skills that permit a reader to construct the meaning of text. Fluency is manifested in accurate, rapid, expressive oral reading and is applied during, and makes possible, silent reading comprehension. Like many other skills, fluency is learned by doing; stamina and persistence is key to sustained improvement, with numerous studies demonstrating a relationship between language and print exposure and skilled reading. Persistence, in turn, can be promoted by increasing engagement. By promoting engagement and reducing frustration through the presentation of the virtual reading partner, readers may be encouraged to persist even if they are struggling with reading, and their general interest in reading may be increased.

Figure 1:
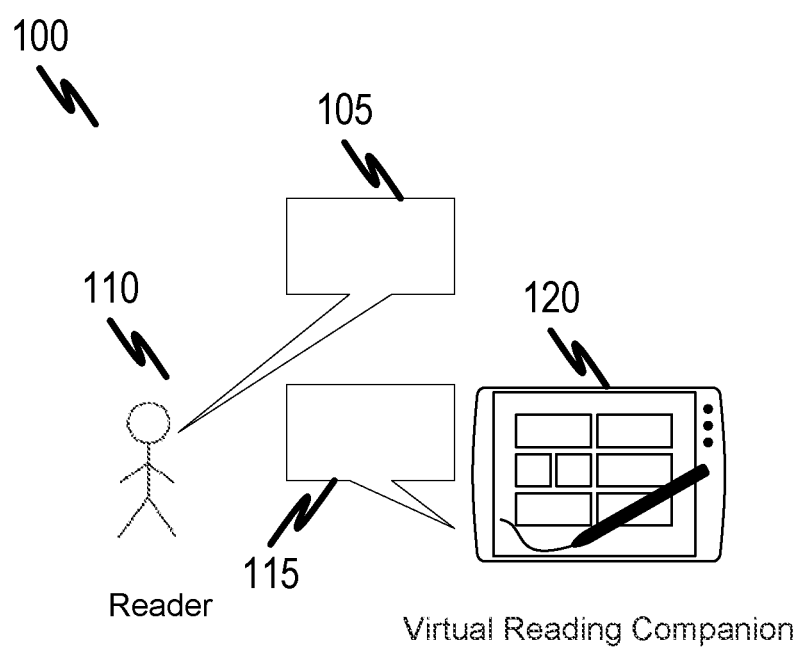
FIG. 1 is a diagram that depicts interaction between a reader and a virtual reading companion.

FIG. 1 is a diagram 100 that depicts interaction between a reader 110, e.g., a child, and a virtual reading companion 120. The reader 110 reads aloud from a written transcript, e.g., a first portion of a book, at 105 while the virtual reading companion 120 listens. The virtual reading companion 120 assesses the reader's fluency based on characteristics of the reader's speaking of words in the first portion of the written transcript and takes a turn reading aloud to the reader, e.g., a second portion of the book, at 115 based on the assessment. For example, in one embodiment, the virtual reading companion 120 determines a length of the second portion of the book to read back to the reader 110 based on the assessment. When the reader 110 is doing well, the virtual reading companion 120 takes a shorter turn, reading a smaller portion, e.g., fewer words, lines, paragraphs, allowing the reader 110 to read a larger proportion of the book. When the reader 110 is determined to be struggling, the virtual reading companion 120 takes a longer turn, reading a larger portion e.g., more words, lines, paragraphs, while the reader 110 follows along.

The virtual reading companion 120 may offer a more engaging reading experience than if the reader read silently by combining the following elements: (1) a story that will capture a reader's imagination (e.g., the first Harry Potter book); and (2) a virtual "partner" who takes turns reading with the reader such that: (a) the reader perceives a benefit from the partner's contribution (the partner helps the reader get through the story faster than the reader could on his own); (b) the interaction is enjoyable and socially non-threatening, e.g., the partner is not overly didactic or prescriptive and does not break the flow of reading; and (c) the interaction is appropriate for the reader's current level of reading fluency, e.g., the partner reads a larger proportion of text to the reader who is a weaker reader. Another advantage offered by the virtual reading companion 120 is that the reader listens to fluent reading and can model his own oral reading after the narrator. Furthermore, during the narrator's turn, the child hears correct pronunciations of many of the words he or she would need to read aloud, thus making the reader's task easier, which will help with reducing frustration.

The virtual reading companion 120 may be designed to interact with a reader of a particular demographic. For example, the reader 110 may be a child under the age of ten. The design and implementation of the virtual reading companion is not limited to one that targets children under the age of ten, and may target readers of a different demographic, e.g., adult non-native speakers.

The virtual reading companion 120 may also be designed to interact with a blind reader. Braille literacy has been declining since the 1960's with approximately 12% braille literacy among the legally blind today. The lack of braille skills has a negative impact on a student's academic and employment opportunities. While access to print information has increased for the visually impaired, especially through the adoption of accessible e-book formats, e.g., EPUB and DAISY, and the Web, the primary access model for students has become audio rather than braille. Since writing skills are impaired by low reading literacy, helping visually impaired children acquire reading fluency in braille is important.

The EPUB3 format, an accessibly designed technical standard which emerged from convergence of multiple digital talking book standards efforts in the 1990's, could be chosen for virtual reading companion targeted to a braille reader. Multimodal, synchronized audio, text and braille, could be provided. Some reading systems include support for refreshable braille synchronized to narrated audio. A system such as Readium would need to be supplemented with refreshable braille using an off the shelf screen reading software package, such as NVDA or JAWS. There may be minor software changes to either the EPUB or Readium code to improve the usability of the refreshable braille presentation.

Figure 2:
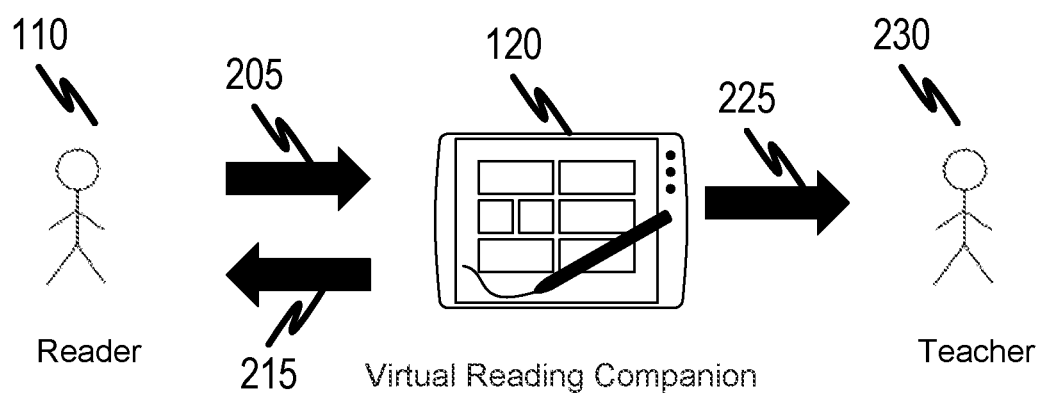
FIG. 2 is a diagram that depicts connectivity and data flow between the reader, the virtual reading companion, and a teacher.

FIG. 2 is a diagram that depicts connectivity and data flow between the reader, the virtual reading companion, and a stakeholder, e.g., a teacher. As the reader 110 reads a first portion from a written transcript aloud, the virtual reading companion 120 captures first audio data and video data at 205. The virtual reading companion 120 processes the first audio data to ultimately assess reading fluency of the reader and the video data to assess engagement of the reader. The virtual reading companion 120 generates second audio data comprising a pre-recorded narration of a second portion of the written transcript or automatically generated text to speech of the second portion. The virtual reading partner, based on the second audio data, is presented to the reader at 215. The virtual reading partner and the reader take turns reading aloud until the end of the written transcript has been reached. The virtual partner's reading could be realized through an audio-book-like professional narration or a text-to-speech synthesizer. At 225, the virtual reading companion presents a report to a teacher 230 or other person. The report comprises the progress of the reader in reading the written transcript as well as other metrics that indicate how well the reader is reading.

The virtual reading companion 120 is designed with the following goals in mind: providing collaborative schemes that are most effective for children at various levels of fluency; features of the virtual environment (introduction to the text, virtual partner, ease of use) that are most effective for promoting reader engagement; kinds of feedback on the reader's oral reading that are most effective for promoting the reader's engagement; aspects of the reader's reading behavior, e.g. accuracy, reading rate, expressiveness, and reading comprehension, that can be automatically evaluated by the system based on the reader's reading; and kinds of reporting would be most useful to stakeholders (schools, teachers, children). Reading comprehension questions may be asked of the reader at the end of a reading session, in order to assess whether the reader is paying attention to the story and how well the reader understands the story.

The virtual reading companion 120 not only supports sustained reading by readers, it also provides a formative assessment of reading fluency, including sub-constructs such as accuracy and expressiveness, and possibly also comprehension (inasmuch as the latter can be recovered from the read-aloud signal) in a continuous and unobtrusive fashion, by collecting and analyzing the reader's oral reading data, while the reader is reading for pleasure rather than for a test. Comprehension may be assessed more directly, e.g., through questions asked at the end of a reading session before the reader exits the collaborative reading application, but nevertheless unobtrusively, as the flow of reading remains uninterrupted. Data collected over the course of the reader's experience of reading an entire book provides an unprecedented window into the fine details of the process of acquisition of reading fluency. The virtual reading companion 120 could be used by schools, elementary school teachers, afterschool programs, summer camps, school and public libraries, families, and individuals to foster reading fluency. The virtual reading companion 120 could also be used by adult readers.

Once reading fluency is attained, the virtual reading companion 120 could become an adaptive partner that would "travel with the reader," switching to activities that could support reading-for-learning. Such activities could involve, e.g., asking questions that promote the retention of information or keeping a running summary of the information. In addition, the virtual reading companion could address the needs of readers at the earlier, decoding, stage, possibly by combining the reader's reading practice using specially adapted materials with the narrator's reading of a real book, e.g., "The Wizard of Oz."

Figure 3:
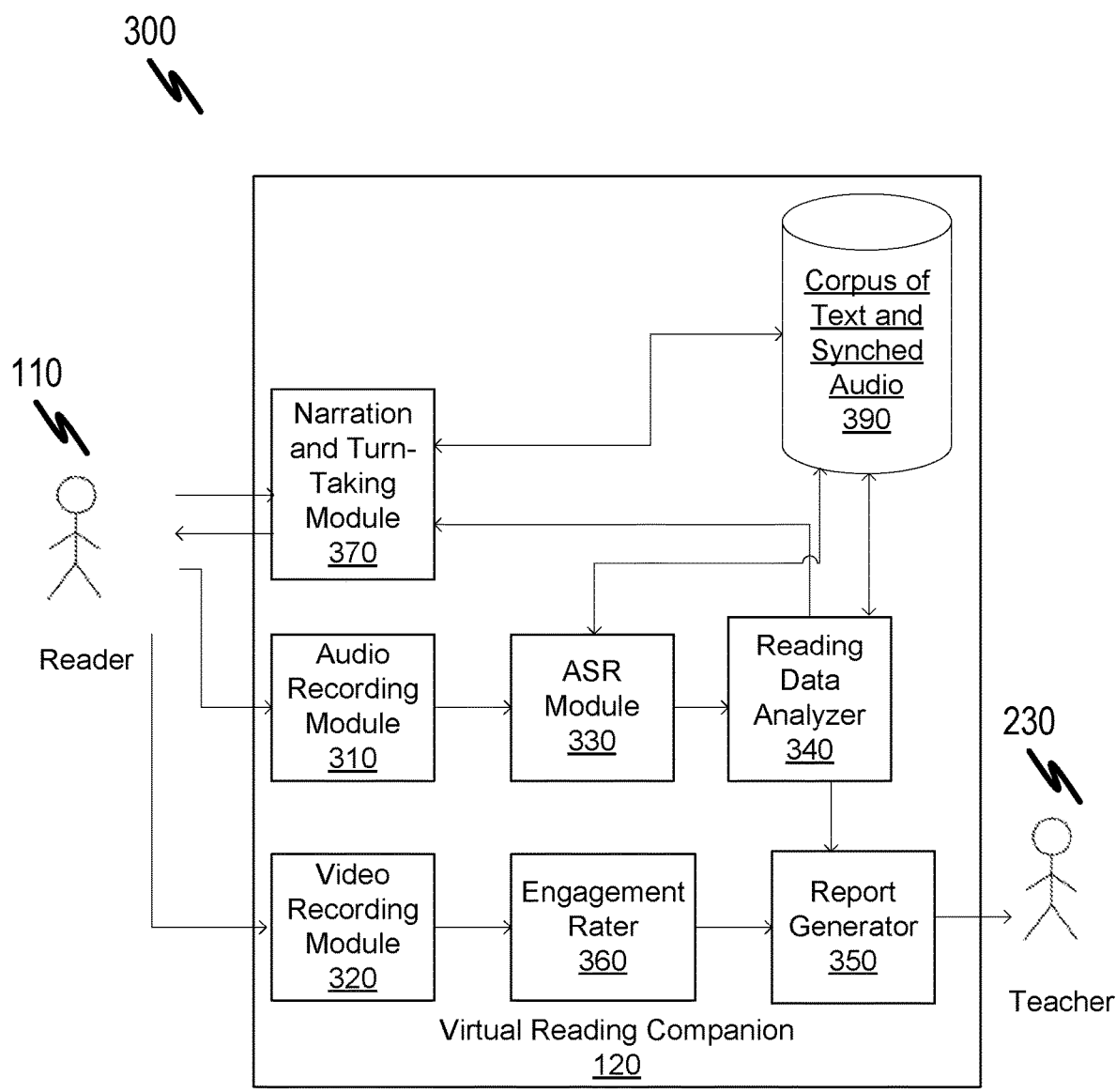
FIG. 3 is a block diagram that depicts modules within the virtual reading companion and data interfaces between the modules.

FIG. 3 is a block diagram 300 that depicts modules within the virtual reading companion 120 and data interfaces between the modules. The virtual reading companion of FIG. 3 includes an audio recording module 310, a video recording module 320, an automatic speech recognition module (ASR) 330, a reading data analyzer 340, a report generator 350, an engagement rater 360, a narration module 370, and a corpus of text and synchronized audio 390. The virtual reading companion 120 provides an interface to the reader 110 and an interface to the teacher 230.

The virtual reading companion 120 receives audio data comprising speech from the reader 110. The speech corresponds to the reader reading a written transcript aloud. The audio recording module 310 receives and records the audio data during a reading session. The audio recording module 310 sends the recorded audio data to the automatic speech recognition module 330.

The ASR module 330 may be implemented with the Kaldi open-source toolkit. The following systems may be used as a baseline and fine-tuned for the design of the ASR module 330: (1) an ASR system developed for spoken dialogue applications/or non-native speakers; (2) an ASR system developed for non-native children speech for the TOEFL Jr assessment; and (3) a Kaldi-based ASR system developed for adult native speech, which was trained on the Libri Speech corpus, a collection of 960 hours of speech sampled at 16 KHz taken from audiobook recordings. All three systems use the Kaldi recognizer, but each has been optimized for a different demographic. System 2 is optimized for the speech of children, primarily non-native speakers of English. System 3 is trained on native speech of adults. System 1 is trained on adult non-native speakers, and it is the only system that has been developed with the goal of optimizing the speech recognition to allow for recognition in real time.

The ASR module 330 can be implemented to meet multiple goals in certain embodiments. In one embodiment, the ASR module 330 accurately recognizes a reader's, e.g. a child's, speech. In a second embodiment, the ASR module 330 allows for the possibility that a child reader deviates from the expected text and to accurately pinpoint and optimally produce a reasonably accurate transcription of such deviations. In a third embodiment, the ASR module 330 distinguishes between a child reader who is attempting to read the page, whether successfully or not, and a child reader who got distracted and is talking to his friend or talking to himself or herself.

The ASR module 330 may use a standard method of acoustic model adaptation using the existing corpora of children's speech such as OHSU kids speech, CMU kids corpus3, and data from ETS assessments aimed at school-age children. The method of acoustic module adaptation may also use the i-vector approach as applied to children's speech. An acoustic model trained on a target demographic embodies what the target demographic sounds like when reading aloud.

A corpus used to train the acoustic model used by the ASR module 330 may consist of new data. As an example, the new data may be collected from 50 and 100 students from the 3rd and the 4th grades in local schools. Each student's oral reading of four texts of varying complexity, each 300 words in length, will be recorded. Two texts will be at the 3rd grade level, two texts will be at a higher level of complexity, and the texts will be presented in randomized order. Several reading comprehension questions will be asked following the reading of each text. The texts and the accompanying questions will be selected from existing reading tests. The students will be asked to read at their own pace with no interference with the reading process. Basic demographic information about each speaker will be collected. The recordings will be done in schools, and each session will last 20-30 minutes with several students recorded concurrently. All responses will be transcribed by a professional transcription agency. The transcriptions can then be checked for accuracy by human research assistants. A subset of the responses will be transcribed by two different transcribers to establish the agreement rate.

A trained language model used by the ASR module 330 contains words and phrases that the audio data is likely to contain. When a reader reads using the virtual reading companion 120, the audio is likely to contain pronunciations of words in a selected written transcript, e.g., a selected book. The language model can be trained to expect the pronunciations of words in the book. Thus, the ASR module 330 may receive data comprising text from the selected book and/or corresponding synchronized audio from the corpus of text and synched audio 190. A separate language model could exist for each page in the book, for each chapter in the book, or for each book. A language module used by the ASR module 330 may be trained by one of two approaches: (1) a more standard approach where the generic language model is adapted to the stimulus; or (2) an approach which uses a generic language model that is trained on a large corpus.

The ASR module 330 has a good chance to achieve a reasonable performance. An example Kaldi-based system achieves 93% accuracy on read-aloud responses from the TOEFL Jr assessment. If the target demographic for the design and implementation of the virtual reading companion 120 is children of a younger age, certain challenges exist. For example, studies have shown that children below the age of ten exhibit a wider variability of various acoustic properties relative to older children and adults. Younger children also exhibit more mispronunciations than older children as well dis-fluency phenomena. Despite these challenges, it is possible to achieve 90% accuracy for an ASR module targeted at 3rd grade children.

The virtual reading companion 120 receives video data that captures a synchronized video of the voice and facial expressions of the reader 110, as well as the screen of the virtual reading companion 120 and the virtual partner's reading during the reading session. The video recording module 320 receives and records the video data during the reading session.

After the reading session has been completed, the video data will be sent by the video recording module 320 to the engagement rater 360. The video data will be processed by the engagement rater 360 to gauge an engagement and/or a frustration of the reader. The engagement rater 360 takes the following into consideration when processing the video: facial expressions, gross body movements, paralinguistic cues, and the general context of the interaction. The engagement rater 360 may even take into account certain occurrences in the audio, such as yawning, long pauses, or off-task speech, in order to assess the engagement of the reader. The engagement rater 360 sends timestamped engagement data to the report generator 350 along with so that these ratings can be linked to reader behaviors during the collaborative reading activity. Video is collected for the purpose of analyzing the data and obtaining insight; video recording is not used as part of the collaborative reading activity itself.

The engagement rater 360 tracks moment-to-moment data. Moment-to-moment changes in emotion are important to consider and capture because that information may be lost when only readers' overall emotional experience is taken into consideration, e.g., from post-activity surveys. For example, reader engagement may diminish over the course of an activity, e.g., a reading session. If a reader only filled out a post-activity survey, it may appear that engagement was low throughout the entire interaction because the reader had low levels of engagement at the end of the activity right before completing the survey. A moment-to-moment investigation, on the other hand, would reveal the time course of engagement diminishing and could reveal whether this was due to timing, e.g., fatigue because the activity is too long, or context, e.g., a particular part of the activity is disengaging for readers. Boredom, frustration, confusion, and engagement/flow are four emotions that may be prevalent during reading as they relate to interest in the task and ability to complete the task. These emotions come from the investigation of moment-to-moment emotions in other learning and problem solving activities such as engaging in a conversation with a computer or a human tutor to learn different science domains. Thus, the data provided by the engagement rater 360 may provide valuable insight towards understanding how the reader 110 experiences the reading process.

The corpus of text and synchronized audio 190 may be based on stories selected to capture the reader's imagination and ensure engagement in the collaborative reading activity.

The corpus of text and synchronized audio 190 contains a corpus of written transcripts, e.g. books, wherein each written transcript has corresponding synchronized, high-quality audio data. The audio may be synchronized at various levels of granularity, e.g., words, phrases, or sentences. To obtain the corpus, the following efforts may be pursued: partnering with providers of such materials, obtaining a license for raw text and audio and using or adapting existing standards-based text/audio synchronization technology, such as the open-source tools developed by the DAISY Consortium; consulting with elementary school librarians and early reading specialists to obtain relevant out-of-copyright material (that is, material in the public domain); recording narrations of chosen books; and creating original reading materials and recording narrations of the original reading materials.

The reading data analyzer 340 receives speech data from the ASR module 330 and may receive data comprising text from the selected book and/or corresponding audio from the corpus of selected text and synched audio 390. Alternatively, the reading data analyzer 340 and the ASR module 330 may be integrated together as one component. The reading data analyzer 340 calculates oral reading rate, e.g., words correct per minute (WCPM). Other indicators of oral reading performance, such as words correct, rate (words per minute), as well as statistics of the reading activity, such as words read, pages read, time spent reading, percentage of the chapter read, and percentage of the book read, may be measured or calculated. Oral reading rate is known to correlate substantially with reading comprehension and to be effective in identifying poor readers. WCPM correlates with reading comprehension scores at about 0.68, and has an 81% accuracy in classifying 4th graders into those reading below basic level. Even a 72% ASR accuracy is sufficient to achieve a 0.86 correlation between WCPM computed based on ASR hypothesis and WCPM computed based on human annotations for 5th to 8th grade students. The reading data analyzer 340 may measure the reader's ability to read in semantically meaningful chunks (such as phrases), ability to adhere to the author's syntax and punctuation, and ability to read with expressive interpretation (e.g., interject feeling and/or anticipation).

The reading data analyzer 340 flags the beginning and end of the fragments where the reader is no longer reading the written transcript and thus accurately identifies the beginning of a particular token in order to track the progress of the reader. A location in the written transcript that indicates where the reader stopped reading aloud is sent to the narration and turn-taking module 370.

The narration and turn-taking module 370 selects a text and corresponding synchronized audio from the corpus of text and synchronized audio 190. Second audio data is generated by the narration and turn-taking module 370 based on the location received from the reading data analyzer 340 and the reading fluency of the reader received from the reading data analyzer 340. The second audio data comprises a pre-recorded narration of a portion of the written transcript or automatically generated text-to-speech. The narration and turn-taking module 370 presents the virtual reading partner to the reader, and the virtual reading partner and the reader take turns reading aloud until the end of the written transcript has been reached.

In one embodiment, the narration and turn-taking module 370 may employ a turn-taking strategy that involves starting turn-taking from the beginning, having the virtual partner read the entire first chapter, or having the virtual partner read the first few, e.g., five, pages and then begin turn-taking.

When the virtual partner is reading aloud, the reader 110 may be provided with some control of the reading tempo, e.g., a pause feature, and some additional scaffolds, e.g., highlighting a word, a phrase, or a sentence the virtual partner is reading). When highlighting occurs, the synchronized audio is aligned with the highlighted word, phrase, or sentence.

Readers will be able to read aloud at their own pace and will not receive direct feedback about the quality of their reading (i.e., readers will not receive corrections for mispronunciations or skipped words). However, readers will receive implicit feedback about errors such as mispronunciations, as those words may appear on the pages that the virtual partner is reading as well; thereby, the reader will gain exposure to the correct pronunciation of the word.

The turn-taking strategy employed by the narration and turn-taking module 370 is based on chunk ratio and chunk size. Chunk ratio refers to the ratio of how much text is being read by the reader compared to the virtual partner, whereas chunk size refers to the amount of text that the reader is reading during his or her turn. For the chunk ratio variable, one of two conditions, equal and unequal, could be used. In the equal condition the reader and the virtual partner will read the same amount of text, whereas in the unequal condition the reader will read less text than the virtual partner. For the chunk size variable, one of two conditions, short and long, could be used. In the short condition the reader will read, e.g., one paragraph of text (or a word-count based chunk, to be determined), whereas in the long condition the reader will read, e.g., one page of text. Table 1 shows the four conditions. The turn-taking strategy may use any one of the four conditions in a given turn, and may use all four conditions throughout the reading of a written transcript.

TABLE 1

Chunk ratio and chunk size conditions

| Chunk Ratio | Chunk Size | Collaborative Reading Actions | |
|---|---|---|---|
| Equal | Short | Student: | Reads one paragraph |
| | | Virtual Partner: | Reads one paragraph |
| Equal | Long | Student: | Reads one page |
| | | Virtual Partner: | Reads one page |
| Unequal | Short | Student: | Reads one paragraph |
| | | Virtual Partner: | Reads one page |
| Unequal | Long | Student: | Reads one page |
| | | Virtual Partner: | Reads two pages |

The virtual reading companion 120 will listen for the end of the narrator audio and automatically start the audio recording module 310 to capture the reader's reading. The transition from reader to virtual partner may be implemented as a button that the reader will press. An automatic transition from reader to virtual partner may occur when the system detects that the reader has finished reading the chunk that has been allocated to him or her. The reader will be able to navigate through the book (turn pages using either the built-in e-reader functionality or the manually inserted navigation buttons).

The report generator 350 provides data in the form of a report to the stakeholder, e.g., the teacher 230. The report generator 350 receives engagement data from the engagement rater 360 and reading fluency data from the reading data analyzer 340. The report generated by the report generator 350 may comprise the progress of the reader in the selected text as well as other metrics that indicate how well the reader is reading. The report may contain measures of reading fluency, including sub-constructs such as accuracy and expressiveness, and possibly also comprehension. The comprehension measures may be based on the reader's ability to read in semantically meaningful chunks, the reader's ability to correctly pronounce words, the reader's ability to correctly interpret punctuation, and the reader's ability to read with expressive interpretation. The report may further comprise a list of skipped words, a list of repeated words, and a list of incorrectly pronounced words. Reading data may be collected and reported over the course of the reader's experience of reading an entire book and may provide an unprecedented window into the fine details of the process of acquisition of reading fluency. The report may further indicate the correlation of the engagement data the proportional occurrence with the WCPM.

Figure 4:
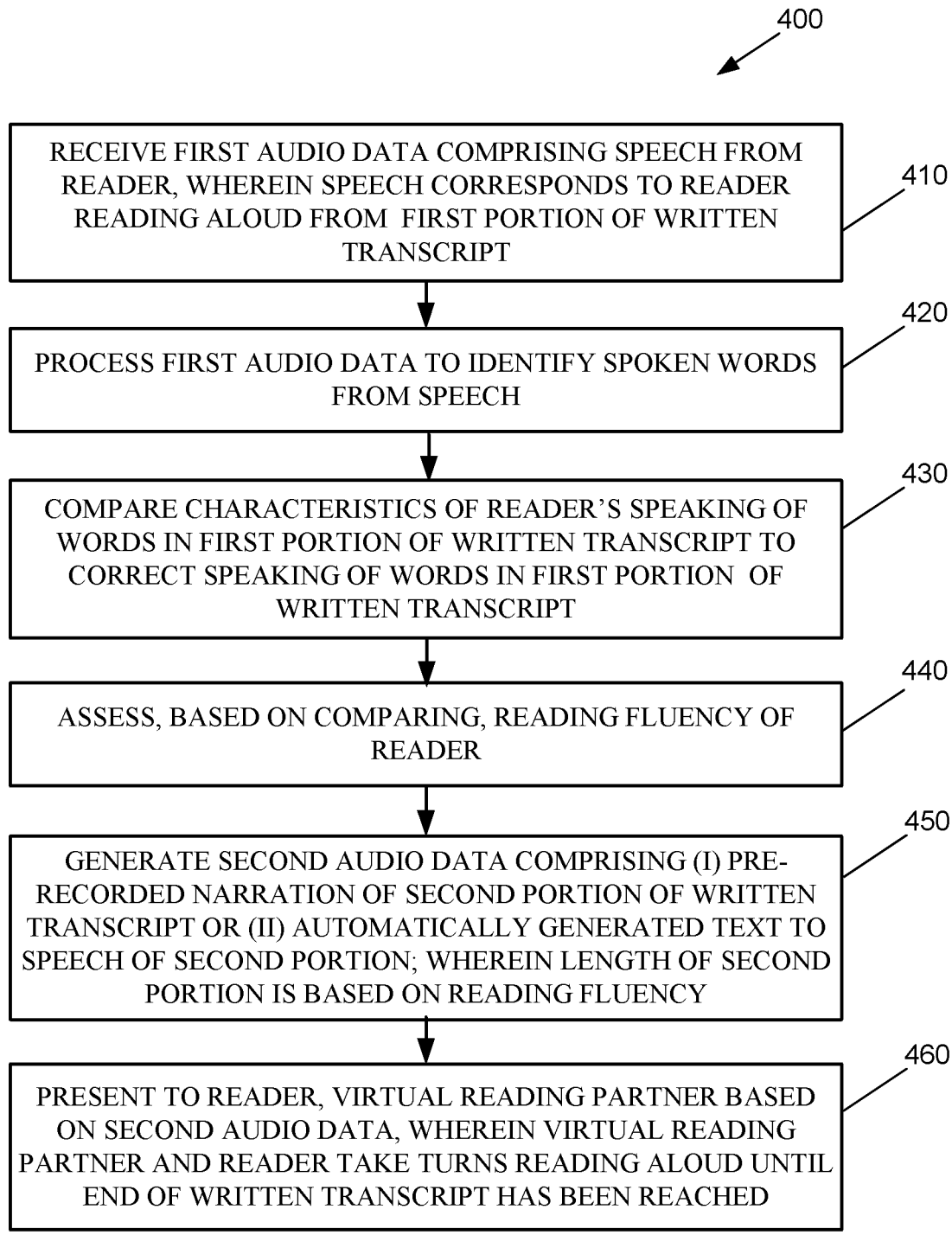
FIG. 4 is a flow diagram that depicts a computer-implemented method of improving reading fluency by presenting a virtual reading partner that takes turns reading aloud with a reader.

FIG. 4 is a flow diagram 400 that depicts a computer-implemented method of improving reading fluency by presenting a virtual reading partner that takes turns reading aloud with a reader. At 410, first audio data comprising speech is received from the reader, wherein the speech corresponds to the reader reading aloud from a first portion of a written transcript. The first audio data is processed to identify spoken words from the speech at 420. At 430, the reader's speaking of words in the first portion of the written transcript to correct speaking of the words in the first portion of the written transcript. A reading fluency of the reader is assessed based on the comparing at 440. At 450, second audio data comprising (i) a pre-recorded narration of a second portion of the written transcript; or (ii) automatically generated text-to-speech of the second portion is generated, wherein a length of the second portion is based on the reading fluency. At 460, the virtual reading partner is presented to the reader based on the second audio data, wherein the virtual reading partner and the reader take turns reading aloud until the end of the written transcript has been reached.

The methods and systems described herein may be implemented using any suitable processing system with any suitable combination of hardware, software and/or firmware, such as described below with reference to the non-limiting examples of FIGS. 5A, 5B, 5C, and 5D.

Figure 5A:
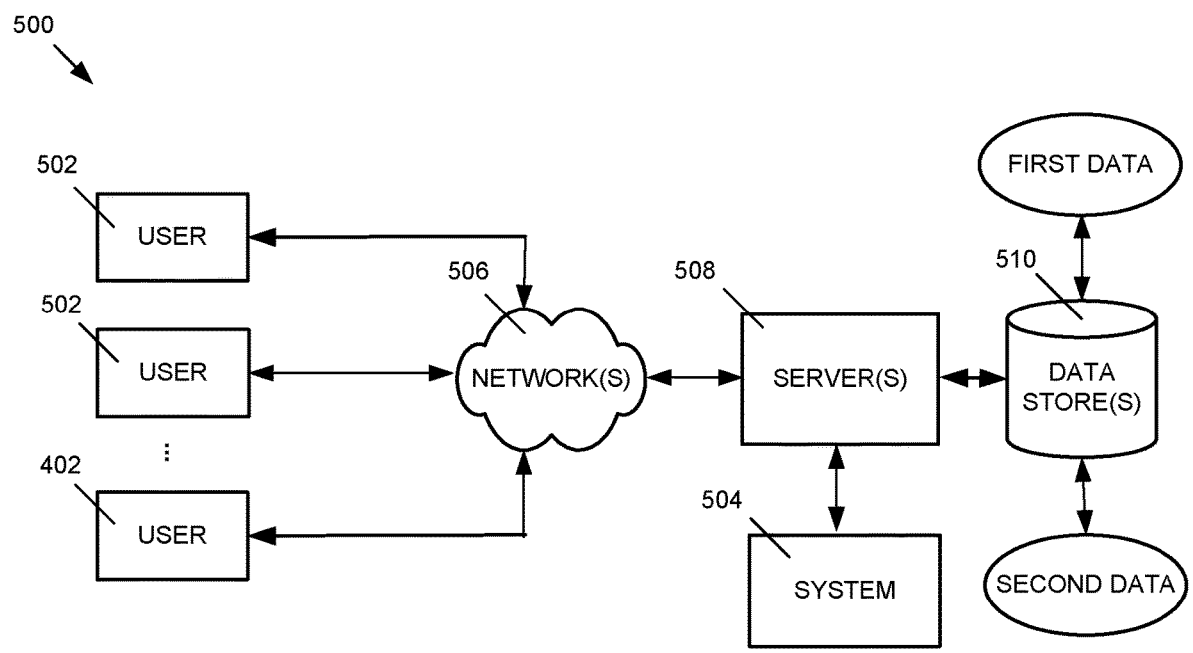
FIGS. 5A, 5B, 5C, and 5D depict example systems for implementing various aspects described herein.

FIG. 5A depicts at 500 a computer-implemented environment wherein users 502 can interact with a system 504 hosted on one or more servers 508 through a network 506. The system 504 contains software operations or routines. The users 502 can interact with the system 504 through a number of ways, such as over one or more networks 506. One or more servers 508 accessible through the network(s) 506 can host system 504. It should be understood that the system 504 could also be provided on a stand-alone computer for access by a user.

Figure 5B:
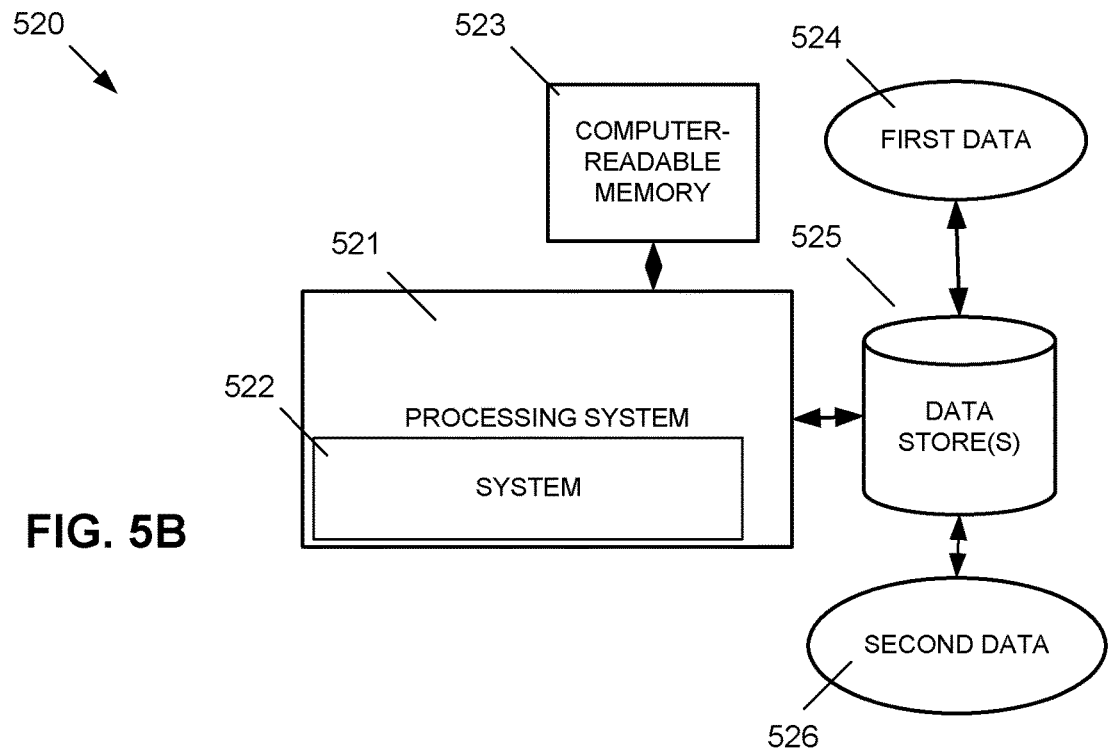
Figure 5C:
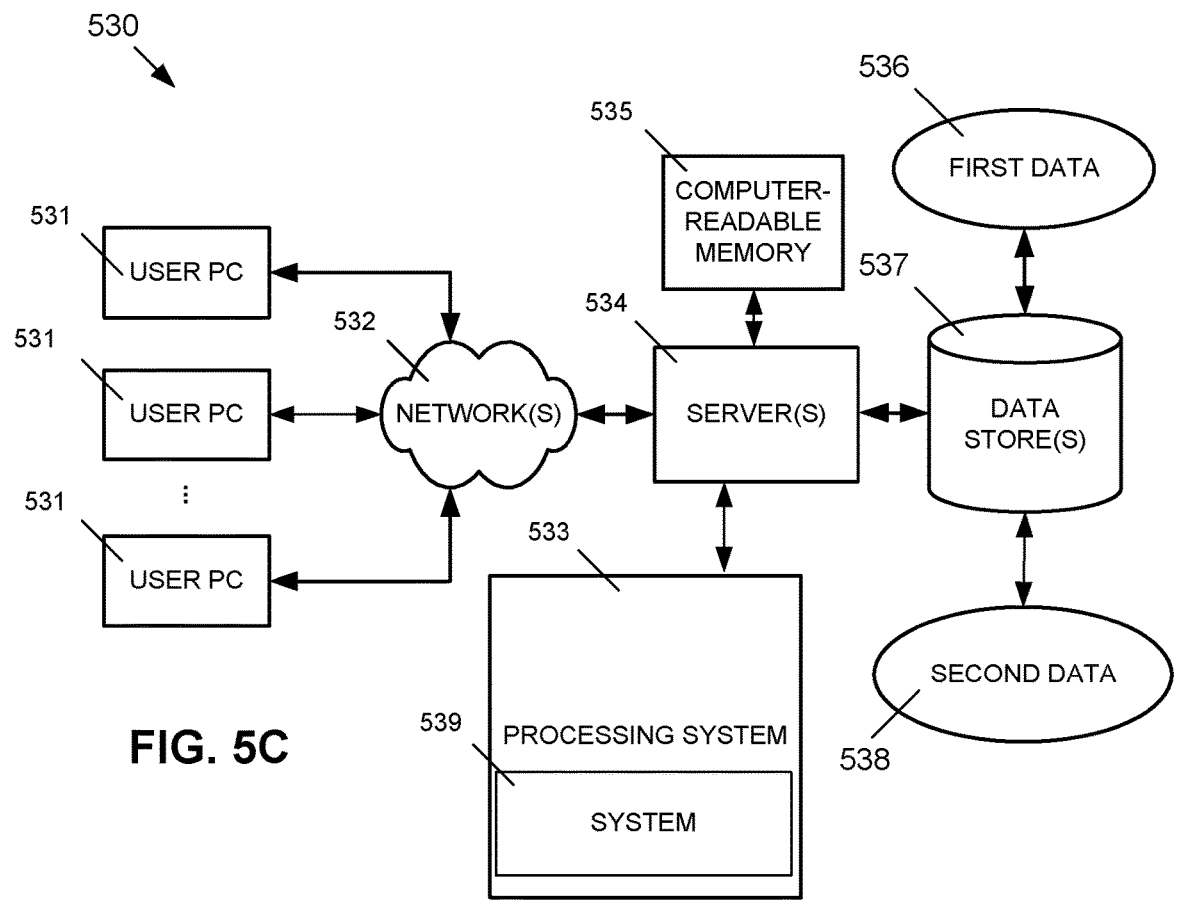
Figure 5D:
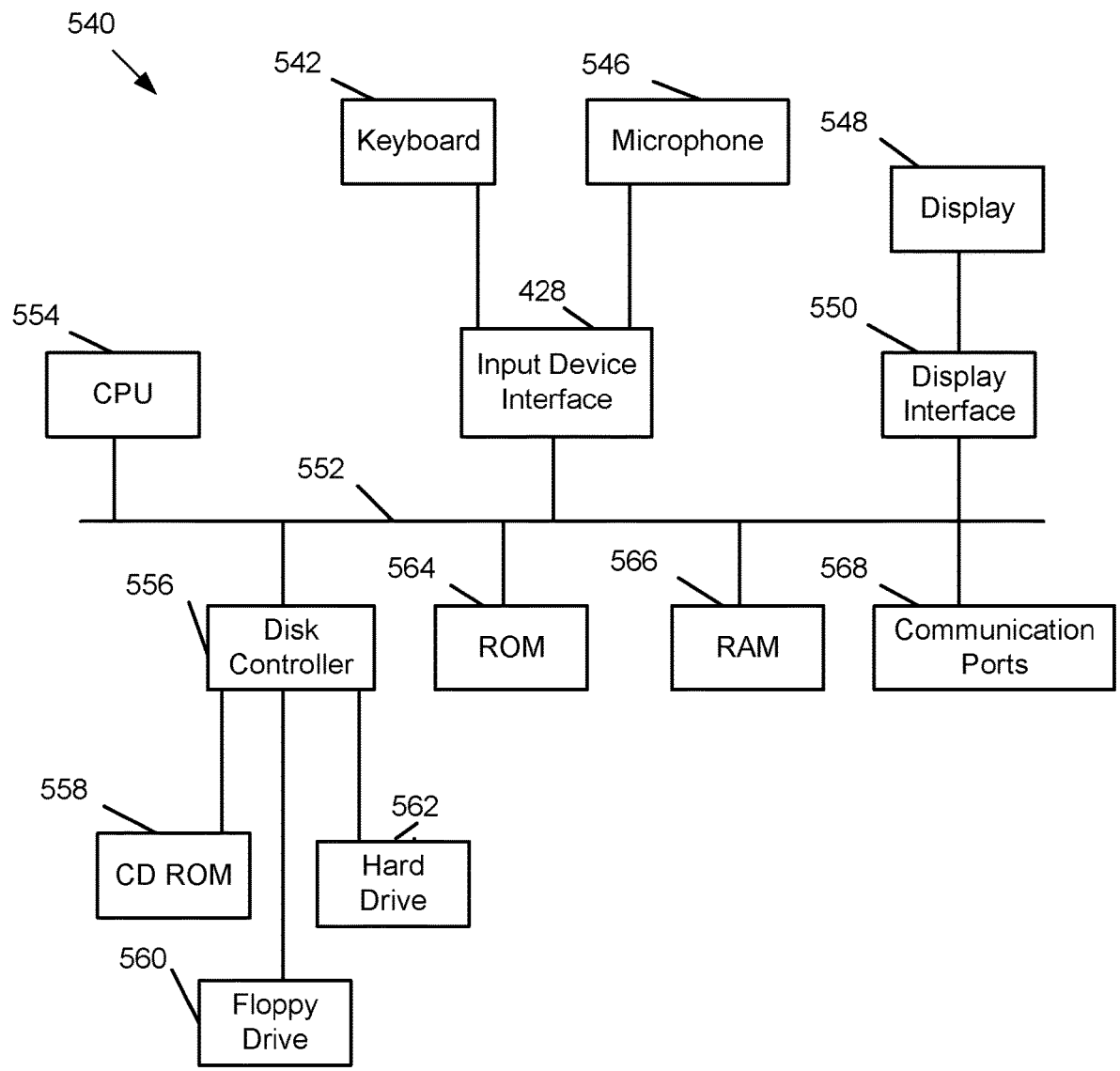

FIGS. 5B, 5C, and 5D depict example systems for use in implementing a system. For example, FIG. 5B depicts an exemplary system 520 that includes a standalone computer architecture where a processing system 521 (e.g., one or more computer processors) includes a system 522 being executed on it. The processing system 521 has access to a non-transitory computer-readable memory 523 in addition to one or more data stores 525. The one or more data stores 525 may contain first data 524 as well as second data 526.

FIG. 5C depicts a system 530 that includes a client server architecture. One or more user PCs 531 accesses one or more servers 534 running a system 539 on a processing system 533 via one or more networks 532. The one or more servers 534 may access a non-transitory computer readable memory 535 as well as one or more data stores 537. The one or more data stores 537 may contain first data 536 as well as second data 538.

FIG. 5D shows a block diagram of exemplary hardware for a standalone computer architecture 540, such as the architecture depicted in FIG. 5B, that may be used to contain and/or implement the program instructions of system embodiments of the present invention. A bus 552 may serve as the information highway interconnecting the other illustrated components of the hardware. A processing system 554 labeled CPU (central processing unit) (e.g., one or more computer processors), may perform calculations and logic operations required to execute a program. A non-transitory computer-readable storage medium, such as read only memory (ROM) 564 and random access memory (RAM) 566, may be in communication with the processing system 554 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a nontransitory computer-readable storage medium.

A disk controller 556 interfaces one or more optional disk drives to the system bus 552. These disk drives may be external or internal floppy disk drives such as 560, external or internal CD-ROM, CD-R, CD-RW or DVD drives such as 558, or external or internal hard drives 562. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 556, the ROM 564 and/or the RAM 566. Preferably, the processor 554 may access each component as required.

A display interface 550 may permit information from the bus 552 to be displayed on a display 548 in audio, graphic, or alphanumeric format. Communication with external devices may optionally occur using various communication ports 568.

In addition to the standard computer-type components, the hardware may also include data input devices, such as a keyboard 542, or other input device, such as a microphone 546.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer implemented method of improving reading fluency by presenting a virtual reading partner that takes turns reading aloud with a reader, comprising:

receiving first audio data comprising speech from the reader recorded via a microphone and stored in a computer-readable medium, wherein the speech corresponds to the reader reading aloud from a first portion of a written transcript;

processing the first audio data to identify spoken words from the speech using a processor-implemented automatic speech recognition module;

comparing characteristics of the reader's speaking of words in the first portion of the written transcript to characteristics of correct speaking of the words in the first portion of the written transcript, said characteristics of correct speaking being received over a computer network;

assessing, based on the comparing, a reading fluency of the reader;

generating second audio data comprising (i) a pre-recorded narration of a second portion of the written transcript; or (ii) automatically generated text-to-speech of the second portion comprising a computer-simulated voice synthetization of the second portion, wherein a length of the second portion is based on the reading fluency, wherein the second audio data comprises a computer-simulated segment of the written transcript that is inversely proportional in length with the reading fluency, wherein the length of consecutive computer-simulated segments is adapted during cooperative reading of the written transcript when the reading fluency is detected to have changed during reading of the written transcript, wherein the reading fluency decreases, the length of the adapted consecutive computer-simulated segments increases, and wherein the reading fluency increases, the length of the adapted consecutive-simulated segments decreases; and presenting to the reader, the virtual reading partner based on audio playback and the adapted consecutive computer-simulated segments of the second audio data, wherein sound recording automatically resumes following presentation of the second audio data, wherein the virtual reading partner reading the second portion and the reader reading the first portion take turns reading aloud based on the length of the adapted consecutive-simulated segments until the end of the written transcript has been reached, wherein the length of the second portion is longer than a length of the first portion of the written transcript when the length of the adapted consecutive computer-simulated segments increases to a first threshold value, and wherein the length of the second portion is shorter than the length of the first portion of the written transcript when the length of the adapted consecutive computer-simulated segments decreases to a second threshold value.

2. The method of claim 1, wherein the comparing further comprises:
comparing the reader's pronunciations of words in the first portion of the written transcript to correct pronunciations of the words in the first portion the written transcript.

3. The method of claim 1, further comprising:
generating, based on the comparing, a report comprising a measurement at least one of (i) words correct per minute (WCPM); (ii) words correct; (iii) words per minute; (iv) words read; (v) pages read; (vi) time spent reading; (vii) percentage of the chapter read; and (viii) percentage of the book read.

4. The method of claim 3, wherein the report further comprises at least one of: (i) a list of skipped words; (ii) a list of repeated words; and (iii) a list of incorrectly pronounced words.

5. The method of claim 3, wherein the report further comprises comprehension data based on at least one of: (i) the reader's ability to read in semantically meaningful chunks; (ii) the reader's ability to correctly pronounce words; (iii) the reader's ability to correctly interpret punctuation; and (iv) the reader's ability to read with expressive interpretation.

6. The method of claim 1, further comprising:
tracking, based on the comparing, a location in the written transcript that indicates where the reader stopped reading aloud; and
wherein the length of the second portion is further based on the location.

7. The method of claim 3, wherein the report further comprises engagement data based on at least one of: (i) the reader's facial expressions; (ii) the reader's gross body movements; (iii) the reader's paralinguistic cues; and (iv) the reader's occurrences in audio.

8. A system of improving reading fluency by presenting a virtual reading partner that takes turns reading aloud with a reader, comprising:

one or more data processors;
a non-transitory computer-readable medium encoded with instructions for commanding the one or more data processors to execute steps of a process that include:
receiving first audio data comprising speech from the reader recorded via a microphone and stored in a computer-readable medium, wherein the speech corresponds to the reader reading aloud from a first portion of a written transcript;
processing the first audio data to identify spoken words from the speech using a processor-implemented automatic speech recognition module;
comparing characteristics of the reader's speaking of words in the first portion of the written transcript to characteristics of correct speaking of the words in the first portion of the written transcript, said characteristics of correct speaking being received over a computer network;
assessing, based on the comparing, a reading fluency of the reader;
generating second audio data comprising (i) a prerecorded narration of a second portion of the written transcript; or (ii) automatically generated text-to-speech of the second portion comprising a computer-simulated voice synthetization of the second portion, wherein a length of the second portion is based on the reading fluency, wherein the second audio data comprises a computer-simulated segment of the written transcript that is inversely proportional in length with the reading fluency, wherein the length of consecutive computer-simulated segments is adapted during cooperative reading of the written transcript when the reading fluency is detected to have changed during reading of the written transcript, and wherein the reading fluency decreases, the length of the adapted consecutive computer-simulated segments increases, wherein the reading fluency increases, the length of the adapted consecutive-simulated segments decreases; and
presenting to the reader, the virtual reading partner based on audio playback and the adapted consecutive computer-simulated segments of the second audio data, wherein sound recording automatically resumes following presentation of the second audio data, wherein the virtual reading partner reading the second portion and the reader reading the first portion take turns reading aloud based on the length of the adapted consecutive-simulated segments until the end of the written transcript has been reached, wherein the length of the second portion is longer than a length of the first portion of the written transcript when the length of the adapted consecutive computer-simulated segments increases to a first threshold value, and wherein the length of the second portion is shorter than the length of the first portion of the written transcript when the length of the adapted consecutive computer-simulated segments decreases to a second threshold value.

9. The system of claim 8, wherein the comparing further comprises:
comparing the reader's pronunciations of words in the first portion of the written transcript to correct pronunciations of the words in first portion the written transcript.

10. The system of claim 8, wherein the steps further comprise:

generating, based on the comparing, a report comprising a measurement at least one of (i) words correct per minute (WCPM); (ii) words correct; (iii) words per minute; (iv) words read; (v) pages read; (vi) time spent reading; (vii) percentage of the chapter read; and (viii) percentage of the book read.

11. The system of claim 10, wherein the report further comprises at least one of: (i) a list of skipped words; (ii) a list of repeated words; and (iii) a list of incorrectly pronounced words.

12. The system of claim 10, wherein the report further comprises comprehension data based on at least one of: (i) the reader's ability to read in semantically meaningful chunks; (ii) the reader's ability to correctly pronounce words; (iii) the reader's ability to correctly interpret punctuation; and (iv) the reader's ability to read with expressive interpretation.

13. The system of claim 8, wherein the steps further comprise:
   tracking, based on the comparing, a location in the written transcript that indicates where the reader stopped reading aloud; and
   wherein the length of the second portion is further based on the location.

14. The system of claim 10, wherein the report further comprises engagement data based on at least one of: (i) the reader's facial expressions; (ii) the reader's gross body movements; (iii) the reader's paralinguistic cues; and (iv) the reader's occurrences in audio.

15. A non-transitory computer-readable medium encoded with instructions for commanding one or more data processors to execute a method of improving reading fluency by presenting a virtual reading partner that takes turns reading aloud with a reader, the method comprising:
   receiving first audio data comprising speech from the reader recorded via a microphone and stored in a computer-readable medium, wherein the speech corresponds to the reader reading aloud from a first portion of a written transcript;
   processing the first audio data to identify spoken words from the speech using a processor-implemented automatic speech recognition module;
   comparing characteristics of the reader's speaking of words in the first portion of the written transcript to characteristics of correct speaking of the words in the first portion of the written transcript, said characteristics of correct speaking being received over a computer network;
   assessing, based on the comparing, a reading fluency of the reader;
   generating second audio data comprising (i) a pre-recorded narration of a second portion of the written transcript; or (ii) automatically generated text-to-speech of the second portion comprising a computer-simulated voice synthetization of the second portion, wherein a length of the second portion is based on the reading fluency, wherein the second audio data comprises a computer-simulated segment of the written transcript that is inversely proportional in length with the reading fluency, wherein the length of consecutive computer-simulated segments is adapted during cooperative reading of the written transcript when the reading fluency is detected to have changed during reading of the written transcript, and wherein the reading fluency decreases, the length of the adapted consecutive computer-simulated segments increases, wherein the reading fluency increases, the length of the adapted consecutive-simulated segments decreases; and
   presenting to the reader, the virtual reading partner based on audio playback and the adapted consecutive computer-simulated segments of the second audio data, wherein sound recording automatically resumes following presentation of the second audio data, wherein the virtual reading partner reading the second portion and the reader reading the first portion take turns reading aloud based on the length of the adapted consecutive-simulated segments until the end of the written transcript has been reached, wherein the length of the second portion is longer than a length of the first portion of the written transcript when the length of the adapted consecutive computer-simulated segments increases to a first threshold value, and wherein the length of the second portion is shorter than the length of the first portion of the written transcript when the length of the adapted consecutive computer-simulated segments decreases to a second threshold value.

16. The non-transitory computer-readable of claim 15, wherein the comparing further comprises:
   comparing the reader's pronunciations of words in the first portion of the written transcript to correct pronunciations of the words in the first portion the written transcript.

17. The non-transitory computer-readable of claim 15, the method further comprising:
   generating, based on the comparing, a report comprising a measurement at least one of (i) words correct per minute (WCPM); (ii) words correct; (iii) words per minute; (iv) words read; (v) pages read; (vi) time spent reading; (vii) percentage of the chapter read; and (viii) percentage of the book read.

18. The non-transitory computer-readable of claim 17, wherein the report further comprises at least one of: (i) a list of skipped words; (ii) a list of repeated words; and (iii) a list of incorrectly pronounced words.

19. The non-transitory computer-readable of claim 17, wherein the report further comprises comprehension data based on at least one of: (i) the reader's ability to read in semantically meaningful chunks; (ii) the reader's ability to correctly pronounce words; (iii) the reader's ability to correctly interpret punctuation; and (iv) the reader's ability to read with expressive interpretation.

20. The non-transitory computer-readable of claim 15, the method further comprising:
   tracking, based on the comparing, a location in the written transcript that indicates where the reader stopped reading aloud; and
wherein the length of the second portion is further based on the location.

* * * * *